United States Patent [19]
Gale et al.

[11] 3,946,812
[45] Mar. 30, 1976

[54] USE OF MATERIALS AS WATERFLOOD ADDITIVES

[75] Inventors: Walter W. Gale, Houston; Thomas L. Ashcraft, Jr.; Rhoderick K. Saunders, both of Baytown, all of Tex.

[73] Assignee: Exxon Production Research Company, Houston, Tex.

[22] Filed: Mar. 12, 1975

[21] Appl. No.: 557,719

Related U.S. Application Data

[62] Division of Ser. No. 430,330, Jan. 2, 1974.

[52] U.S. Cl. .............................. 166/274; 166/273
[51] Int. Cl.$^2$ ........................................ E21B 43/22
[58] Field of Search ................... 166/273, 274, 275; 252/8.55 D

[56] References Cited
UNITED STATES PATENTS

| | | | |
|---|---|---|---|
| 3,500,923 | 3/1970 | Reisberg | 166/275 X |
| 3,638,728 | 2/1972 | Hill | 166/273 |
| 3,712,377 | 1/1973 | Hill et al. | 166/273 X |
| 3,768,560 | 10/1973 | Hill et al. | 166/274 |
| 3,827,497 | 8/1974 | Dycus et al. | 166/274 |

*Primary Examiner*—John E. Murtagh
*Assistant Examiner*—George A. Suckfield
*Attorney, Agent, or Firm*—Lewis H. Eatherton; Gary D. Lawson

[57] ABSTRACT

One embodiment includes an oil recovery process, more particularly a secondary or tertiary type crude oil recovery process utilizing a drive fluid to move a displacing fluid through a subterranean formation wherein the displacing fluid displaces crude oil therefrom and is driven through the formation by means of the drive fluid. The crude oil recovery process is improved by utilizing as the drive fluid a thickened, transparent, aqueous solution of a water-soluble sulfated, polyethoxylated $C_{10}$–$C_{18}$ primary alcohol or alkylated phenol. The displacing fluid is generally an aqueous surfactant solution, a miscible displacing medium or most preferably a microemulsion. In a further embodiment, the water-soluble, polyethoxylated $C_{10}$–$C_{18}$ primary alcohol or alkylated phenol is employed as a mobility control agent in a waterflood thereby increasing the sweep efficiency thereof.

6 Claims, 2 Drawing Figures

USE OF MATERIALS AS WATERFLOOD ADDITIVES

CROSS REFERENCE TO RELATED APPLICATIONS

This application is a division of copending application Ser. No. 430,330, filed Jan. 2, 1974.

BACKGROUND OF THE INVENTION

1. Field of the Invention

This invention relates in one embodiment to a method of recovering crude oil from subterranean formations wherein a displacing fluid is injected into the formation through at least one injection means to displace crude oil and is driven by means of a drive fluid toward at least one production means; more specifically, this invention in that embodiment relates to a secondary and/or tertiary recovery method for recovering crude oil from a subterranean formation wherein an improved drive fluid is employed to drive through the formation a displacing fluid capable of displacing the crude oil in the formation to the production means. In a further embodiment of the present invention a waterflood of improved sweep efficiency is provided through the use of a specific mobility control agent.

2. Description of the Prior Art

Knowledge is widespread in the oil industry that the so-called "primary recovery" techniques, which include natural flow, gas lifting, gas repressurization and pumping methods, leave substantial quantities of oil in oil-bearing reservoirs. Recognition of the large amount of oil remaining in many oil-producing reservoirs has led to the use of so-called "secondary and tertiary recovery" techniques which have as their primary purpose the economical recovery of additional quantities of the oil known to be present in the reservoir.

Probably one of the more common secondary recovery techniques is the so-called "waterflooding" in which aqueous fluids are injected at one or more points in the reservoir at pressures sufficient to force the fluids out into the reservoir and toward a spaced production well or wells. This, in effect, displaces oil from the pores of the reservoir and drives the oil ahead of the water front.

However, such techniques, e.g. waterflooding, are only advantageous when the cost of injecting water and necessary chemical modifiers is less than the value of the oil recovered. As a result the displacement efficiency of waterfloods or the like has been the determining factor of whether such a technique will be used.

Generally, the difficulty with waterfloods is that the small pores and capillaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil-bearing reservoirs the oil tends to be trapped within the pores of the rock formations by capillarity, merely forcing water therethrough will not displace this trapped oil. However, a sufficient reduction in the interfacial tension between the water and the oil will increase the amount of oil that will be displaced by the water. Thus, various aqueous surfactant systems have been proposed for use in waterflooding processes for recovering oil, the surfactants having the ability to reduce the interfacial tension between the oil and water.

Many aqueous systems containing surfactants have also been proposed in which the effective oil recovery is improved by treating the formation with a liquid which contains an oil-solubilizing, aqueous solution of surfactant micelles that are combined with molecules of an amphiphilic organic compound of low water solubility; the amphiphilic material being capable of swelling the surfactant micelles and causing the aqueous solution to solubilize a significant proportion of oil. In using such systems oil is recovered by injecting an aqueous liquid to drive the surfactant system and the oil towards the production means.

A fluid which has been used in secondary and tertiary oil recovery is one which employs a solvent that is miscible with both the connate oil and with the flood water. This fluid is introduced into the formation ahead of the flood water. Alcohols and various other organic solvents have been proposed as suitable miscible agents for use in the so-called miscible flooding operation. Methods utilizing hydrocarbons as miscible fluids are extremely successful with regard to the displacement efficiency of the crude oil, particularly the ability to displace essentially all of the crude oil from the formation contacted. However, the volumetric sweep efficiency of these flooding media is a disadvantage. The hydrocarbons inherently finger and channel to a great extent and a large portion of the reservoir is bypassed although the volume of injected hydrocarbons may be great. This is economically disadvantageous.

A typical miscible flooding process is the miscible slug process. This is a process which consists of injecting a limited quantity of fluid, e.g. propane, LPG, or similar solvent, into an oil reservoir and pushing this liquid bank toward producing wells with another fluid injected subsequently. The injected fluid being miscible with reservoir oil results in efficient displacement of the oil.

More recently, attention has turned toward the injection of a microemulsion in the form of a microemulsion slug. Such microemulsion can be defined as a stable transparent or translucent micellar solution of oil and water that may contain one or more electrolytes, and a surfactant, optionally containing one or more cosurfactants. The oil, water and surfactant are essential components of the microemulsion with the surfactant being present in an amount greater than the critical micelle concentration so as to form the desired microemulsion. The microemulsion can be a water-external microemulsion, an oil-external microemulsion or a microemulsion in which there is no discernible external phase.

Regardless of the type of displacing fluid which is employed in the secondary and/or tertiary recovery process, one or more slugs of the displacing fluid are driven through the formation by means of a driving fluid. To eliminate a "fingering" effect of the displacing fluid slug through the formation, the displacing fluid slug is generally provided with a mobility control agent. Likewise, in order to eliminate an unwarranted fingering effect between the displacing fluid and drive fluid, it has been proposed to thicken the drive fluid so that the mobility of the drive fluid is substantially equal to or less than the mobility of the displacing fluid slug.

Various materials have been proposed for use as thickening agents or mobility control agents to increase the viscosity of the flood water. Such materials include fatty acid soaps, alginates, sucrose, dextran, amines, glycerine, and a number of water-soluble polymers. The materials which have been found commercially satisfactory fall into two general categories, the first being the natural polymers such as polysaccharides with the second being a class of polyacrylamides, specifically partially hydrolyzed polyacrylamides. Commercially available thickeners falling within the foregoing groups include a material sold by Kelco Industries under the name of "Kelzan XC," a polysaccharide, and materials sold by Dow Chemical under the name "Pusher," a partially hydrolyzed polyacrylamide. While these materials are effective in thickening the aqueous flood and decreasing the mobility thereof, they have certain serious drawbacks, particularly when utilized to drive a microemulsion slug and in waterflood applications.

For example, the polysaccharides, while showing sufficient thickening characteristics, have the disadvantage of poor filtration characteristics, particularly in saline water. The polyacrylamide materials are also disadvantageous in that they show permanent shear degradation effects even at low shear rates. Materials of the foregoing types, cannot be advantageously employed as driving fluids for microemulsion slugs since both types of material show very poor phase behavior with microemulsions, the microemulsions quickly breaking down into multiphase systems, thereby shortening the efficient miscible displacement of single phase microemulsions. Accordingly, the art has long sought a drive fluid which can be effectively employed with all typically employed displacing fluids which eliminates the disadvantages of the materials proposed heretofore.

SUMMARY OF THE INVENTION

It has been discovered in accordance with the present invention that the foregoing disadvantages can be eliminated and an improved process for recovering crude oil can be provided in one embodiment by injecting into the formation at least one displacing fluid and driving such displacing fluid through the formation by means of an aqueous driving fluid comprising a thickened, transparent, aqueous solution of a water-soluble sulfated, polyethoxylated $C_{10}$–$C_{18}$ alcohol, e.g., primary alcohol or alkyl phenol. In this regard it has been discovered that the use of such driving fluid eliminates the fingering and degradation disadvantages and demonstrates good phase behavior, particularly when driving a microemulsion slug through the subterranean formation. Still further, it has been discovered that the use of the specific materials enumerated above and illustrated hereinbelow provides a thickening effect at least comparable in cost per centipoise to the materials commercially available thus providing an economical drive fluid. Accordingly through the foregoing an advantageous process for the recovery of crude oil from a subterranean formation has been developed, such process being particularly applicable in secondary and tertiary recovery.

In a further embodiment of the present invention an improved waterflood is provided by utilization of a thickened, transparent, aqueous solution of a water-soluble, sulfated polyethoxylated $C_{10}$–$C_{18}$ alcohol, e.g., primary alcohol or alkylated phenol, ahead of the waterflood thereby increasing the sweep efficiency of the waterflood and increasing oil production, not by surfactant action but through the provision of a more favorable mobility and sweep of the reservoir.

Therefore it is a primary object of the present invention to provide a process for the recovery of crude oil from a subterranean formation wherein a displacing fluid is injected into the formation through at least one injection means and the displacing fluid is driven through the formation by means of a drive fluid, wherein such process eliminates the inherent disadvantages and deficiencies of previously proposed processes.

It is a further object of the present invention to provide an improved process for the recovery of oil from a subterranean formation by injecting into such formation at least one displacing fluid and driving the displacing fluid through the formation by means of a driving fluid comprising a thickened, transparent, aqueous solution of a water-soluble sulfated, polyethoxylated $C_{10}$–$C_{18}$ primary alcohol or alkylated phenol.

It is yet a further object of the present invention to provide such improved process for the recovery of crude oil from a subterranean formation wherein the driving fluid comprises a thickened, transparent, aqueous solution of a water-soluble, sulfated, polyethoxylated $C_{10}$–$C_{18}$ primary alcohol or alkylated phenol, in an amount sufficient to reduce the mobility of the driving fluid and increase the production of the crude oil.

It is yet a further object of the present invention to provide such process in which the displacing fluid is a microemulsion slug and the poor phase behavior associated with conventional driving fluids is eliminated by use of a driving fluid comprising a thickened transparent aqueous solution of a water-soluble, sulfated polyethoxylated $C_{10-18}$ primary alcohol or alkylated phenol.

It is yet a further object of the present invention to provide an improved waterflood process in which the sweep efficiency of the waterflood is improved through the injection of a slug of an aqueous solution of a water-soluble sulfated polyethoxylated $C_{10}$–$C_{18}$ primary alcohol or alkylated phenol ahead of the waterflood.

Still further objects and advantages of the process of the present invention will be apparent from the following more detailed description thereof.

DESCRIPTION OF PREFERRED EMBODIMENT

Figure 1:
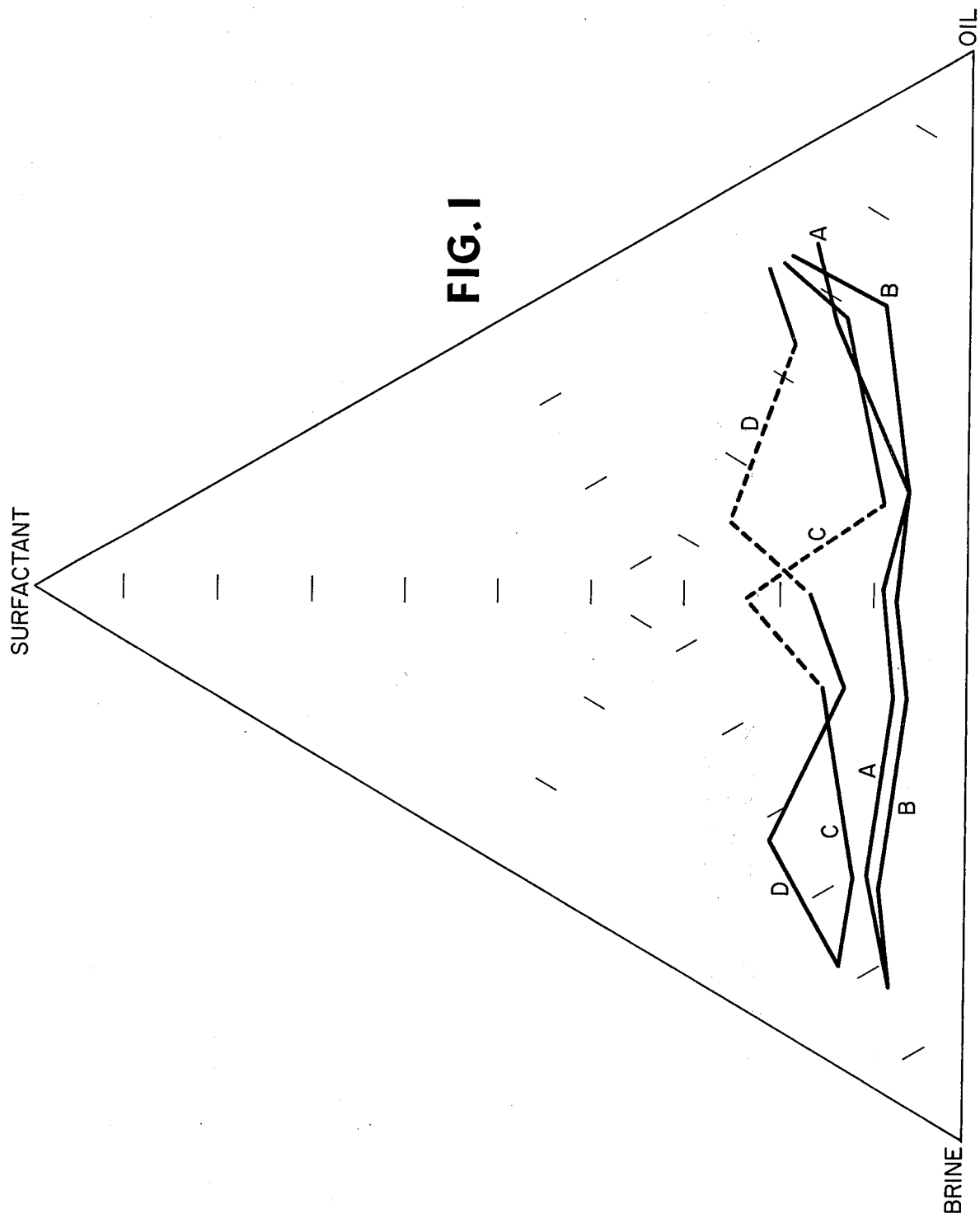
FIG. 1 is a ternary diagram of a microemulsion system illustrating superior phase behavior associated with the water-soluble, sulfated polyethoxylated alcohols of the present invention when compared with commercially available thickeners.

The process of the present invention is applicable to all phases of crude oil recovery; however, the process is particularly adapted for secondary and tertiary recovery. Accordingly, the description hereinabove and the description which follows is presented to embrace not only secondary and tertiary recovery of oil but any and all waterflooding processes and processes in which a driving fluid is utilized to drive a displacing fluid which is injected into the formation through at least one injection means and which displaces crude oil toward at least one production means.

One embodiment of the process is applicable to driving any and all slugs which are introduced into the formation for the purpose of displacing crude oil. Accordingly, the process of the present invention finds application in driving aqueous surfactant slugs which, as previously indicated, optionally contain an amphiphilic material of low water solubility so as to enhance the displacement associated with the employment of the aqueous surfactant system. Still further the process finds application in those recovery techniques in which a slug of a miscible solvent is employed to provide a miscible displacement of the crude oil within the formation. As indicated above however the process of the present invention has particular applicability in driving a slug of microemulsion since an advantageous characteristic of the present invention, not associated with previously employed systems, involves the unexpectedly superior phase behavior associated with the specific materials of the present invention and microemulsion slugs.

The displacing fluids applicable in accordance with the present invention are well known in connection with techniques for recovering crude oil. For example surfactants employed in the aqueous surfactant system can be any of the anionic, nonionic, or cationic types as well as mixtures thereof. Similarly the miscible displacement fluids are generally comprised of semipolar, organic compounds such as alcohols, ketones, esters, etc. and/or hydrocarbons as well as other known agents miscible with the formation crude, with the microemulsions being stable, transparent or translucent micellar solutions of oil, water, and surfactant, optionally containing one or more electrolytes and/or cosurfactants. Any type of microemulsion is applicable, it being noted that two of the criteria for successful microemulsion flooding are a minimization of the multiphase region and low interfacial tension in the multiphase region eventually reached by breakdown of the single-phase microemulsion by dilution with formation water, oil, and drive fluid thereby turning effective miscible displacement into the less effective immiscible displacement. Again any displacing fluid which can be utilized for displacing and recovering crude oil can be advantageously employed in the process of the present invention.

Generally, the displacing fluid viscosity is controlled so as to eliminate an undesirable "fingering" of the displacing fluid through the formation. Likewise, to achieve the objects and advantages of the present invention, the viscosity of the driving fluid utilized to drive the displacing fluid slug or slugs through the formation, should be substantially equal to or greater than that of the displacing fluid so as to eliminate unwarranted fingering effects. These objects and advantages are achieved by employing in the driving fluid a water-soluble, sulfated, polyethoxylated $C_{10}$–$C_{18}$ alcohol or alkyl phenol which provides a transparent, single-phase, aqueous driving fluid which can effectively promote crude oil recovery by allowing the displacing fluid to displace the crude oil without any of the disadvantages inherent in systems previously utilized.

The materials utilized to effectively reduce water mobility behind displacing fluid slugs are water-soluble, sulfated, polyethoxylated $C_{10}$–$C_{18}$ alcohols, more specifically water-soluble, sulfated, polyethoxylated $C_{10}$–$C_{18}$ primary alcohols and alkyl phenols.

Typical ethoxylated alcohols are available commercially from Shell Chemical Company under the trade name "Neodol" or from Conoco under the name "Alfol" and others. A typical "Neodol" identified as Neodol 23–6.5 which is a mixture of $C_{12}$–$C_{13}$ alcohol having an average of 6.5 (EO) ethoxylate groups has the properties shown in Table 1.

TABLE 1

| Detergent alcohol | $C_{12}$–$C_{13}$ |
|---|---|
| carbon number range | |
| Melting Range, °C. | 11–15 |
| Color, APHA (Pt-Co) | 40 |
| Specific Gravity, 50/25°C. | 0.963 |
| Flash Point, Cleveland Open Cup, °F. | 410 |
| Fire Point, Cleveland Open Cup, °C. | 445 |
| Cloud Point, 1% solution, °C. | 45 |
| Hydroxyl number, mg. KOH/gm. | 116 |
| Water (Karl Fischer), percent weight | 0.3 |
| Acid value, eq./100 g. | Less than 0.001 |
| Odor | Mild |

Other typical ethoxylated alcohols are shown in Table 2 and have the following properties where EO is —$CH_2CH_2O$— radical.

TABLE 2

| | Ethoxylates | | |
|---|---|---|---|
| Analyses | $C_{12}$–$C_{15}$ 3 EO | $C_{12}$–$C_{15}$ 7.5 EO | $C_{12}$–$C_{15}$ 9 EO |
| Ash, percent | 0.2 max | 0.01 max | 0.01 max |
| Color, APHA | 100 max | 75 max | 75 max |
| pH, 1% Solution | 5.5–6.5 | Within 0.5 water used | Within 0.5 water used |
| Acid value, eg./100 g. | 0.004 max | 0.0003 max | 0.0003 max |

Conoco "Alfol" alcohols such as "Alfonic" 1012-6 or 1218-6 have the structural formula:

$$CH_3—(CH_2)_x—CH_2—(OCH_2CH_2)_n—OH$$

where $x$ is 8–16 and $n = 5.8$.

Thus, Alfonic 1012-6 is a $C_{10-12}$ primary alcohol containing six ethylene oxide units and 1218-6 is a $C_{12-18}$ primary alcohol containing six ethylene oxide units.

The ethoxylated alcohols can be easily sulfated by reacting the ethoxylated alcohol with chlorosulfonic acid or any other conventional sulfating agent. Sulfated ethoxylated alcohols are also commercially available materials, for example, by Shell Chemical Company under the trade name Neodol 23-3A having the following formula:

$$C_{12-13}O(CH_2CH_2O)_3SO_3NH_4$$

and Neodo 25-3S having the following formula:

$$C_{12-15}O(CH_2CH_2O)_3—SO_3Na$$

The foregoing sulfated, ethoxylated alcohols have the following properties:

TABLE 3

| Typical Physical and Chemical Properties of Neodols | | |
|---|---|---|
| | Neodol Ethoxysulfates | |
| Analyses | 23-3A | 25-3S |
| Molecular weight | 423 | 441 |
| Active content, percent weight | 59 | 59 |
| EO content, percent weight | 31.2 | 29.8 |
| Color, APHA (Klett Color) | 35 | 35 |

TABLE 3-continued

Typical Physical and Chemical Properties of Neodols

| Analyses | Neodol Ethoxysulfates | |
|---|---|---|
| | 23-3A | 25-3S |
| Specific gravity, 25/25°C | 1.01 | 1.02 |
| Ethanol, percent wt. | 14 | 14 |
| Unsulfated organic matter, percent weight | 2.5 | 2.5 |
| Inorganic salt, percent weight | 1.0 | 1.0 |
| Odor | Mild | Mild |
| pH | 7.3 | 7.7 |

Other anionic, sulfated, ethoxylated alcohols are available from Union Carbide under the trade name "Tergitol S," which have the properties shown in Table 4.

TABLE 4

| Property | Tergitol Anionic[1] | |
|---|---|---|
| | 15-S-3A[2] | 15-S-3S[3] |
| Alkyl carbon range | $C_{11}-C_{15}$ | $C_{11}-C_{15}$ |
| Average moles of ethylene oxide | 3 | 3 |
| Active content, percent by weight | 435 | 440 |
| Color platinum-cobalt | 60[4] | 60[4] |
| Odor | Mild and characteristic | |
| Pour Point, °F | −33 | −49 |
| pH, 1.0% aqueous solution at 77°F | 6.5-7.5[5] | 8.0-10.0[5] |
| Solubility in water at 77°F | Soluble | Soluble |
| Apparent specific gravity at 25/25°C | 1.039 | 1.057 |
| Pounds per gallon at 68°F | 8.65 | 8.80 |
| Viscosity, cks: | | |
| At 68°F | 43 | 49 |
| At 104°F | 22 | 23 |
| Flash point, °F, Cleveland Open Cup (ASTM Method D 92) | 195 | 172[6] |

[1] Composition: ethoxysulfate
[2] Cation: ammonium
[3] Cation: sodium
[4] 10 percent solution in water; Klett-Summerson units
[5] Determined on a 2% aqueous solution
[6] Determined by ASTM Method D 1310 using Tag open cup Any and all of the foregoing water-soluble, sulfated, polyethoxylated alcohols can be employed in accordance with the present invention, the alcohols being primary alcohols or alkyl phenols. In this regard ethoxylated materials such as polyethoxylated alkyl phenols, specifically octyl and nonyl phenols, are commercially available under the trade name "Triton X-100." Similarly the well known sulfated polyoxyalkylated glycols, esters, and ethers may be employed to increase the viscosity of the aqueous flood and to reduce water mobility behind aqueous surfactant, microemulsion and miscible slugs, etc.

In the preferred embodiment of the present invention, the watersoluble, sulfated, polyethoxylated $C_{10}-C_{18}$ alcohol is a sodium sulfate of a polyethoxylated $C_{10}-C_{18}$ primary alcohol with the product sold under the name "Neodol 25-3S" being a representative example. This material is one in which an average of three ethylene oxide groups are attached to the molecule. Of course, greater or lesser amounts of ethylene oxide can be attached and the present invention finds application in the use of those watersoluble, sulfated materials which contain from 1 to about 100 moles and preferably 1 to about 10 moles of ethylene oxide per mole of compound. Still further, those sulfates which have from 10 to 18 carbon atoms are applicable with those from 12 to 15 carbon atoms being most preferred. In this regard it has been discovered that the selection of any particular material for any specific use can be easily determined through routine experimentation. By changing the carbon content and/or ethylene oxide content based upon the salinity of the aqueous flood, it is possible to achieve optimum viscosity and optimum mobility for the aqueous flood behind the displacing fluid slug. Thus, it has been discovered that to accommodate a higher salinity it is merely necessary to increase the ethylene oxide content or decrease the carbon chain length within the limits set forth above. Again, the selection of any particular material within the foregoing limits to achieve the objects and advantages of the present invention can be easily carried out.

The selection of materials for use in secondary and tertiary recovery is always governed by economics since the value of recovered crude oil must be greater than the cost of materials utilized. Accordingly, the cost of materials is a factor which must be seriously considered in the development of any process for the displacement of crude oil and recovery of the same through secondary and tertiary techniques. The process of the present invention compares favorably with the commercially available materials and processes since it has been determined that the cost per centipoise of the water-soluble, sulfated, polyethoxylated alcohol employed in accordance with the present invention is no greater than that of the commercially available products.

An adequate increase in viscosity and associated decrease in mobility of the aqueous flood behind the displacing fluid slug can be achieved by utilizing up to about 1.5% of the water-soluble, sulfated, polyethoxylated alcohol or alkyl phenol based on the weight of the aqueous flood. No lower limit for the amount of the sulfate exists and in actuality it should be the smallest amount possible governed by the results which provide the desired increase in viscosity and the desired decrease in mobility. Although the maximum of 1.5% is set forth above, it should be recognized that this upper limit is for economic reasons primarily and the water-soluble, sulfated, polyethoxylated alcohol can be employed in slightly greater amounts to achieve specific results.

The drive fluid employed in accordance with the present invention is a transparent, aqueous solution of the water-soluble, sulfated, polyethoxylated alcohol or alkyl phenol. In this regard it is important that a multiphase system not be present but that a transparent, single-phase, aqueous solution be utilized as the drive fluid. Moreover, since the water-soluble, sulfated, polyethoxylated alcohol or alkyl phenol is not subject to limitations based upon salinity, the salinity can vary within wide limits. In this regard the process of the present invention finds particular applicability in high salinity environments, i.e., salinities of 2% or more, where other conventionally utilized materials encounter difficulties when used. Moreover, since the water-soluble, sulfated polyethoxylated alcohol or alkyl phenol is compatible with the ions normally present in the formation, the presence of divalent calcium and magnesium ions does not adversely affect the objects and advantages which are achieved through the use of the drive fluid in the process of the present invention. Similarly, problems of poor filtration and degradation are completely avoided.

It should be apparent that the percent formation pore volume of displacing fluid utilized in the process of the present invention depends among other factors, upon the crude oil, the formation, and the type of displacing fluid slug utilized. While the above is true, in general practice the displacing fluid slug is employed in an amount from about 1% to about 40% or more formation pore volume to displace the crude oil. Also, the pore volume of the driving fluid is not subject to any particular limitations and amounts less than, equal to, or greater than 100% pore volume can be advantageously employed. The drive fluid is employed in an amount sufficient to drive the displacing fluid through the formation, thereby displacing the crude oil and driving the same toward the production means. Volumes typical in the environment of the present invention, e.g. from about 10% to about 60% PV or more, can be used without limitation.

In the typical embodiment employing the process of the present invention one or more displacing fluid slugs is injected into the subterranean formation through one or more injection wells spaced apart from one or more production wells. The displacing fluid slugs are driven by injecting the aqueous flood drive fluid containing the water-soluble, sulfated, polyethoxylated alcohol or alkyl phenol in accordance with the present invention. The displacing fluid slugs displace the crude oil toward the production wells wherein the crude oil is withdrawn to the surface of the earth. Accordingly, in the preferred embodiment of the present invention one or more injection wells are in communication with one or more production wells through the subterranean formation. While this is the case, it should be readily apparent that the process of the present invention is also applicable to a system wherein the same well acts both as the injection well and production well in a "push-pull" type of operation. Accordingly, the description set forth above is deemed to embrace this type of operation as well as the conventional operation employing one or more injection wells spaced from one or more production wells.

As indicated previously, the process of the present invention finds great application with regard to driving a microemulsion slug employed in secondary or tertiary crude oil recovery. The application of the process of the present invention to the foregoing environment is based upon the fact that the transparent, aqueous drive solution shows a favorable phase behavior with the microemulsion slug. In this respect previous drive solutions containing natural and synthetic polymeric thickeners have been unsatisfactory with respect to microemulsion slugs since the phase behavior is quite poor and the microemulsion readily breaks down to a multiphase system in the presence of the thickening agent. Reference to FIG. 1 will readily explain the unexpected superiority of the drive solution containing the water-soluble, sulfated, polyethoxylated alcohol when compared with conventionally employed thickeners such as polysaccharides or partially hydrolyzed polyacrylamides.

In FIG. 1 four curves are set forth in order to compare the phase behavior of the water-soluble, sulfated polyethoxylated alcohol of the present invention with respect to microemulsions and the phase behavior of the commercially available Kelzan XC and Dow Pusher. It should be noted in reference to FIG. 1 that the ability of a microemulsion to effectively displace crude oil in a subterranean formation is dependent upon a minimization of the multiphase region and a low interfacial tension in this region since in the single phase region the displacement of the crude oil is miscible and substantially all of the oil can be recovered and upon breakdown of the microemulsion into the multiphase region, the displacement of the crude oil becomes immiscible and a portion of the oil remains trapped in the pores of the subterranean formation. Accordingly, for a drive fluid to be effective, the same must not only possess the appropriate mobility ratio with the microemulsion slug, but in addition the phase behavior of the microemulsion in the presence of the drive fluid must be such that breakdown of the single phase microemulsion into the multiphase region must not be accelerated.

Turning to FIG. 1, curve A represents the binodal curve developed for a water-oil-surfactant system wherein the water is high salinity Tar Springs Brine (approximately 100,000 ppm dissolved solids). The oil was a 90/10 Isopar-M/Heavy Aromatic Naphtha (HAN) mixture, Isopar-M and Heavy Aromatic Naphtha being tradenames for refined paraffinic and aromatic oils respectively sold by Exxon Company, U.S.A. and the surfactant was an 86.2% active mixture of a monoethanolamine $C_{12}$ orthoxylene sulfonate and a sulfate of a $C_{18}$ phenol containing approximately 13 moles of ethylene oxide, the sulfate being present in the surfactant system to provide increased brine tolerance for the monoethanolamine $C_{12}$ orthoxylene sulfonate so as to allow an effective comparison of the thickeners in the high salinity Tar Springs Brine. For purpose of reference it is noted that with regard to the binodal curve representing this control example without any added thickener, the area above binodal curve A represents the single phase region with the area below the binodal curve representing the multiphase region. For purposes of an effective microemulsion flooding procedure minimization of the multiphase region is desired so that miscible displacement of the crude oil can take place for a longer period of time.

Binodal curve B represents an embodiment within the scope of the present invention wherein the Tar Springs Brine contains 1.5% of a water-soluble, sulfated polyethoxylated alcohol, in this case a sulfate of a $C_{14}$ alcohol containing approximately 4.7 moles of ethylene oxide. The water-soluble, sulfated, polyethoxylated alcohol was employed in the Tar Springs Brine in an amount of 1.5%. It is noted when comparing Binodal curve B with Binodal curve A that when utilizing this water thickener the area of the ternary diagram below the binodal curve, i.e., the multiphase region, has in fact been reduced. This therefore illustrates the effective phase behavior associated with the water-soluble, sulfated, polyethoxylated alcohol of the present invention when employed in combination with the microemulsion.

Curve C represents the binodal curve for an embodiment outside the scope of the present invention utilizing 750 ppm Kelzan XC in the Tar Springs Brine. It can be observed that the multiphase region in the ternary diagram has been greatly increased and in fact an area exists in which the single phase region could not be observed (denoted with dotted lines). This feature associated with the binodal curve when Kelzan XC is employed in the brine and the increase in the multiphase region of the ternary diagram with the resulting decrease in the single phase region indicate the poor phase behavior of the Kelzan XC with the microemulsion and indicates that an early breakdown of a microemulsion into the multiphase region will occur when Kelzan XC is employed as a thickening agent or mobility control agent in a drive fluid. Accordingly, binodal curve C illustrates the disadvantageous characteristics of Kelzan XC in the environment of the present invention, specifically in connection with the employment of microemulsions in the recovery of crude oil.

The last curve in the FIGURE, curve D, represents the binodal curve wherein 750 ppm Dow Pusher was introduced into the Tar Springs Brine. Here again, as was the case with regard to curve C, it is noted that the area below the binodal curve, i.e., the multiphase region, is greatly increased with the corresponding decrease in the single phase region and a similar area exists in which the single phase region cannot be appropriately identified. This therefore establishes the poor phase behavior associated with Dow Pusher and microemulsion systems such that the microemulsion would tend to break down earlier into the multiphase region in the presence of the Dow Pusher thereby illustrating the ineffectiveness of this thickener or mobility control agent in a drive fluid associated with microemulsions utilized for the recovery of crude oil.

It is noted that the compositions utilized to prepare binodal curves C and D contained the Kelzan XC and Dow Pusher in amounts less than water-soluble sulfated, polyethoxylated alcohol utilized in the composition in the preparation of binodal curve B. The use of even greater amounts of the Kelzan XC and Dow Pusher will produce even further adverse effects such that a true comparison between the thickener or mobility control agent of the present invention and those of the prior art is made through the foregoing. However, as indicated previously, due to the lower cost of the water-soluble, sulfated, polyethoxylated alcohols when compared with conventionally employed thickeners or mobility control agents, the thickening effect achieved in accordance with the present invention on a cost per centipoise basis is equivalent to the conventionally employed thickeners. Accordingly, the improved phase behavior associated with the water-soluble, sulfated, polyethoxylated alcohols or alkyl phenols of the present invention when compared with the conventionally employed materials is an advantage which illustrates the superiority of the present invention over the use of commercially available materials.

While the foregoing discussion deals primarily with the employment of the aqueous solution of the water-soluble, sulfated, polyethoxylated $C_{10}$–$C_{18}$ alcohol, e.g., primary alcohol or alkylated phenol, as a driving fluid to drive a displacing fluid through a subterranean formation, a further embodiment of the present invention, an improved waterflood, is provided by utilizing a thickened, transparent, aqueous solution of a water-soluble, sulfated, polyethoxylated $C_{10}$–$C_{18}$ alcohol ahead of the waterflood, thereby increasing the sweep efficiency of the waterflood, increasing oil production not by surfactant action but through the provision of a more favorable mobility and sweep of the reservoir. When utilized in this manner, the thickened, transparent, aqueous solution will be injected into the subterranean formation as a slug prior to the waterflood, thereby increasing the oil production which can be achieved through the waterflooding operation. Generally the volume of the injected slug of thickened, transparent, aqueous solution will be from about 10% to 60% pore volume with the waterflood being injected in greater amounts to recover the crude oil trapped within the subterranean formation. Accordingly, the utilization of the thickened, transparent, aqueous solution of the water-soluble, sulfated, polyethoxylated $C_{10}$–$C_{18}$ alcohol in this environment constitutes a further improvement associated with the present invention.

The method of the present invention will now be described by reference to the following examples. It is to be understood that such examples are presented for purposes of illustration only and the present invention cannot under any circumstances be deemed limited thereby.

EXAMPLE 1

This example was conducted in order to demonstrate the viscosity increasing ability of various water-soluble, sulfated, polyethoxylated alcohols within the scope of the present invention. In this experiment the viscosity of solutions of the water-soluble, sulfated, polyethoxylated alcohols was investigated as a function of surfactant concentration and structure, with each viscosity being determined in a capillary viscometer at 100°F using 100% Tar Springs Brine as the dispersing medium. The compounds investigated were as follows:

$C_{12}$ —O—$(EO)_{3.6}$ $SO_3^-$ $C_{12}$ —O—$(EO)_{3.8}$ $SO_3^-$ $C_{12}$ —O—$(EO)_{2.0}$ $SO_3^-$ $C_{18}$ —O—$(EO)_{3.4}$ $SO_3^-$ $(C_{12}$–$C_{15})$ —O—$(EO)_{3.0}$ $SO_3^-$

Figure 2:
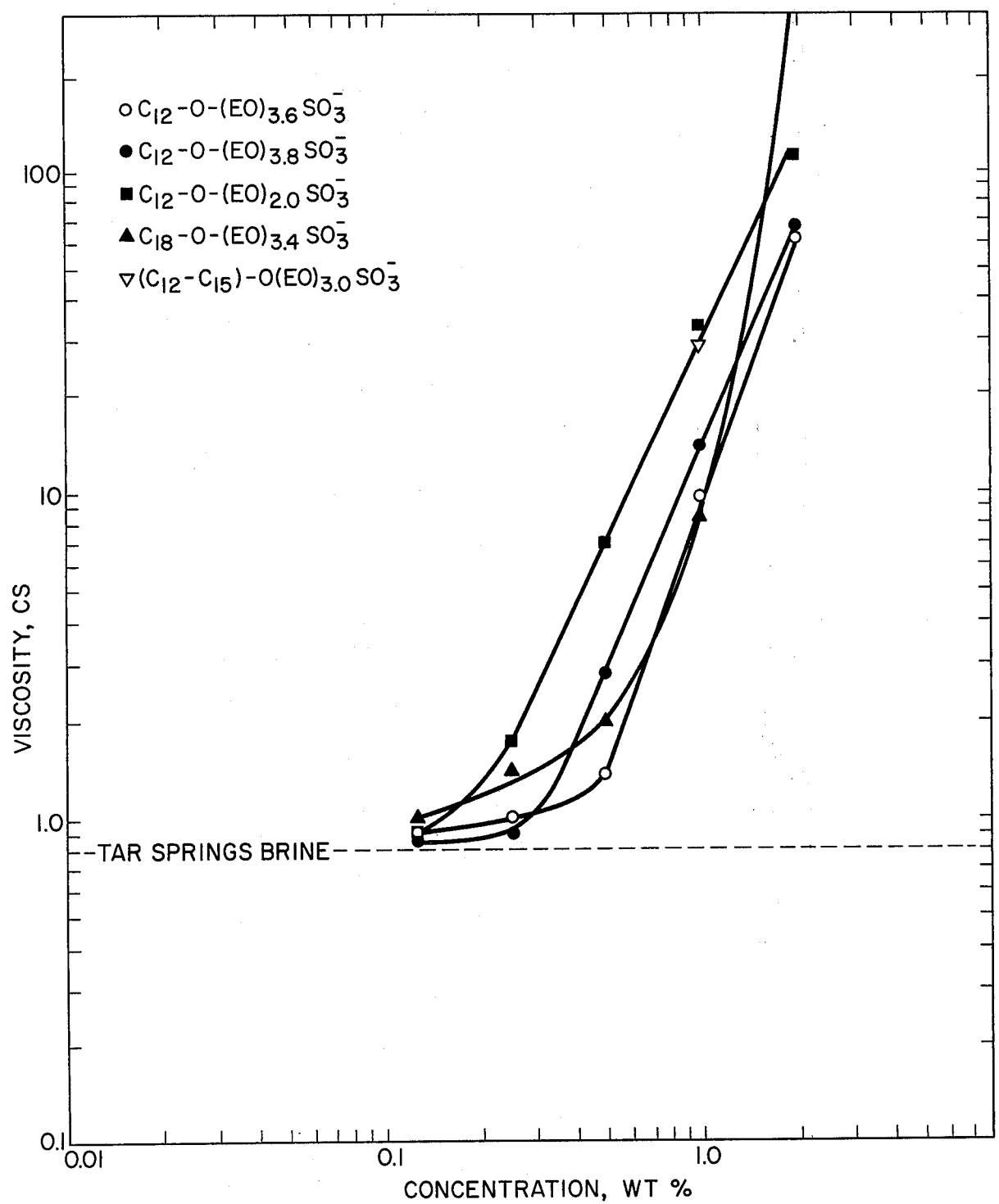
FIG. 2 is a plot of viscosity versus concentration illustrating the viscosity increase effect in accordance with the present invention.

FIG. 2 plots the viscosity in centipoise versus the concentration of surfactant in weight percent. It can be seen from FIG. 2 that all of the water-soluble, sulfated, polyethoxylated alcohols enumerated above showed a substantial viscosity increasing ability in the high salinity brine. Based upon the low cost of the water-soluble, sulfated, polyethoxylated alcohols it can be determined from the viscosity increase data above that a viscosity increase in cost per centipoise of the water-soluble, sulfated, polyethoxylated alcohols is at least equivalent to the commercially available Kelzan XC and Dow Pusher.

COMPARATIVE EXAMPLE 1 and EXAMPLE 2

The effectiveness of the water-soluble, sulfated polyethoxylated, alcohol in a driving fluid to drive a high salinity microemulsion when compared with a similar driving fluid containing Kelzan XC can be readily seen in this Comparative Example 1 and Example 2 carried out in accordance with the present invention.

The microemulsion employed was one comprising 40.4% Tar Springs Brine, 47.0% of an oil, a 90/10 Isopar-M/HAN mixture, 4.1% of the surfactant monoethanolamine $C_{12}$ orthoxylene sulfonate, 5.1% of an ethoxylated alkyl phenol sulfate having a chain of 18 carbon atoms and an average of 13.2 moles of ethylene oxide, the ethoxylated sulfate being employed to increase the brine tolerance of the monoethanolamine $C_{12}$ orthoxylene sulfonate surfactant, and 3.4% isopropyl alcohol to reduce the viscosity of the microemulsion.

A 10% PV bank of the foregoing microemulsion was injected into a 4′ long Berea core containing residual Loudon crude oil (an oil from the Loudon Field Illinois) with the microemulsion being driven by a 1,000 ppm solution of Kelzan XC in Tar Springs Brine for comparative purposes. Severe core plugging was experienced making the microemulsion flooding process unsatisfactory. From the flooding test it was determined that when the microemulsion was diluted with the Tar Springs Brine in the presence of the Kelzan XC, a quite viscous material arose at the multiphase boundary and the multiphase region was encountered almost immediately, the viscosity of the material being much higher than that observed with the brine alone. It is this encountering of the multiphase region almost immediately which eliminates the effectiveness of the microemulsion flooding process in that the miscible displacement of the crude oil occurs only with the microemulsion being in the single phase region. Accordingly, it can be concluded from this comparative experiment that the Kelzan XC shows poor phase characteristics with the microemulsion.

In comparison with the above an example was carried out in accordance with the present invention in which a 10% PV bank of the same microemulsion composition was followed by 8,000 ppm Neodol 25-3S in Tar Springs Brine. As a result of such procedure, almost 90% of the crude oil was recovered and when the oil present in the microemulsion phases was accounted for the total recovery amounted to 100% of the crude oil and more than half of the oil injected in the slug. Since no actual formation of two or more phases was observed with the Neodol 25-3S in the Tar Springs Brine in association with the microemulsion, it is concluded that the excellent phase behavior attributed to the water-soluble, sulfated, polyethoxylated alcohol in conjunction with the microemulsion provides for the effective recovery of the crude oil.

Still further, when Tar Springs Brine alone followed a 5% PV bank of the same microemulsion above, the maximum pressure exceeded 35 psi and no appreciable surfactant was produced. When the Neodol 25-3S was present in the Tar Springs Brine following the 5% PV slug of the microemulsion, however, a maximum pressure of 4.9 psi was observed and surfactant was produced. Also, a lower final oil saturation was achieved in the case of employing the water-soluble, sulfated, polyethoxylated alcohol in the drive fluid when compared to the case of its absence. This therefore establishes the effectiveness of the water-soluble, sulfated, polyethoxylated alcohol to release entrapped surfactants thereby improving recovery results.

While the present invention has been described primarily with regard to the foregoing specific exemplification, it should be understood that the present invention cannot under any circumstances be deemed limited thereto but rather must be construed as broadly as all or any equivalents thereof.

We claim:

1. In a method of recovering crude oil from a subterranean formation by a waterflooding process, the improvement wherein the waterflood is preceded by injection into said formation of a slug of a transparent, aqueous solution of a water-soluble, sulfated, polyethoxylated alcohol, said aqueous solution being substantially free of any other thickening agent and any other surface active agent.

2. The method of claim 1 wherein said sulfated, polyethoxylated alcohol is a sulfated, polyethoxylated $C_{10-18}$ primary alcohol or alkylphenol.

3. The method of claim 2 wherein said sulfated, polyethoxylated alcohol is a sulfated, polyethoxylated $C_{12-15}$ primary alcohol.

4. A method of recovering crude oil from a subterranean formation having at least one injection means in fluid communication with at least one production means which comprises:

injecting into said formation through said injection means a slug of a transparent, aqueous solution of a water-soluble, sulfated, polyethoxylated alcohol, said aqueous solution being substantially free of any other thickening agent and any other surface active agent;

subsequently injecting into said formation through said injection means a waterflood; and recovering crude oil through said production means.

5. The method of claim 4 wherein said sulfated, polyethoxylated alcohol is a sulfated, polyethoxylated $C_{10-18}$ primary alcohol or alkylphenol.

6. The method of claim 5 wherein said sulfated, polyethoxylated alcohol is a sulfated, polyethoxylated $C_{12-15}$ primary alcohol.

* * * * *